United States Patent [19]

Morgan

[11] Patent Number: 4,680,169

[45] Date of Patent: Jul. 14, 1987

[54] REMOVAL OF AMMONIUM ION FROM ACIDIC LIQUORS

[75] Inventor: Thomas R. Morgan, Jordan, N.Y.

[73] Assignee: Allied Corporation, Morris Township, Morris County, N.J.

[21] Appl. No.: 814,831

[22] Filed: Dec. 30, 1985

[51] Int. Cl.$^4$ .............................................. C01B 21/00
[52] U.S. Cl. .................................... 423/53; 210/758; 210/903; 423/351; 423/544; 423/551
[58] Field of Search ................ 423/351, 53, 544, 551; 210/758, 903

[56] References Cited

U.S. PATENT DOCUMENTS 1,245,605 11/1917 Lucas ................................... 210/758
3,998,714 12/1976 Armstrong .......................... 210/758

FOREIGN PATENT DOCUMENTS 2430848 1/1976 Fed. Rep. of Germany ...... 210/758
75592 6/1975 Japan ................................... 423/351
129188 7/1985 Japan ................................... 210/758

OTHER PUBLICATIONS

Chemical Abstracts Citation 84 (16) 107997s.

*Primary Examiner*—John Doll
*Assistant Examiner*—Wayne A. Langel
*Attorney, Agent, or Firm*—Harold N. Wells; Jay P. Friedenson; Patrick L. Henry

[57] ABSTRACT

An improved process for reducing ammonium ion concentration in an ammonium ion-containing, acidic liquor is provided. The process includes the essential step of reacting ammonium ion with a persulfate.

4 Claims, No Drawings

REMOVAL OF AMMONIUM ION FROM ACIDIC LIQUORS

DESCRIPTION

1. Technical Field

The present invention relates to the removal of ammonium ion from an acidic liquor.

2. Background Art

The removal of ammonium ion from an acidic or mildly acidic liquor, particularly from a bichromate liquor, has long been a problem.

The commercial production of sodium bichromate from chromite ore begins with roasting and leaching steps. The resultant leach liquor is acid treated with typically either sulfuric or carbonic acid to form sodium bichromate and either sodium sulfate or sodium bicarbonate. Upon concentration of the acid-treated, leach liquor, crystallization of sodium sulfate (or of sodium bicarbonate if carbonic acid is used to acid treat) occurs, and the crystallized material is separated. The sodium bichromate may be sold as the dihydrate crystal or as a concentrated solution.

Ammonium bichromate may be produced from sodium bichromate and ammonium sulfate, or from chromic acid and ammonia. Disposal of ammonium ion-containing wash down liquors, from the production of ammonium bichromate, presents a problem, as they are not combinable with other process liquors. Inadvertent contamination of sodium bichromate liquors with ammonium ion results in a severe problem. Ammonium ion is usually present under mildly acidic conditions in the contaminated bichromate liquors.

Methods available for removal of ammonium ion are not economical. The usual method would be the addition of alkali so as to evolve gaseous ammonia. For a contaminated bichromate liquor, this method would entail converting all contaminated liquors from bichromate to chromate, and then the addition of more acid to neutralize any free alkali and convert chromate back to bichromate.

Therefore, there is a long-felt need for an improved process for reducing ammonium ion concentration in acidic liquors, particularly in bichromate liquors. Such a process should not involve the addition of a contaminating ion that would be difficult to dispose of. Such a process would be especially remarkable if it generated a useful side product.

DISCLOSURE OF THE INVENTION

It is accordingly an object of the present invention to provide an improved process for reducing ammonium ion concentration in acidic liquors.

It is a further object to provide an improved process for reducing ammonium ion concentration in bichromate liquors.

It is an even further object to provide an improved process that does not involve the addition of a contaminating ion that would be a problem to dispose of.

It is a still further object to provide an improved process that generates a useful side product.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided an improved process for reducing ammonium ion concentration in an ammonium ion-containing, acidic liquor. The process includes the essential step of oxidatively converting ammonium ion in the acidic liquor, to nitrogen with a persulfate.

BEST MODE FOR CARRYING OUT THE INVENTION

As explained earlier, this invention provides a novel process for reducing ammonium ion concentration in an acidic or mildly acidic liquor, particularly in a bichromate liquor. By "mildly acidic" is meant, for purposes of this description of my invention, a pH of from about 2.5 to 4.5.

I have found that ammonium ion concentration can be readily reduced in an acidic liquor without costly neutralization. Ammonium ion concentration can be reduced by oxidation thereof using a persulfate. While not wishing to be bound by any theory, I believe that the following reaction occurs:

$$2NH_4^+ + 3S_2O_8^{-2} \rightarrow N_2 + 6SO_4^{-2} + 8H^+.$$

The preferred inorganic persulfate for use in my process is sodium persulfate, as use thereof results in the formation of sodium sulfate, which is present in many process streams, thereby avoiding the addition of contaminating ions. If desired, sodium sulfate by-product may be recovered. Other persulfates could, of course, be employed.

Advantageously, the acid value formed by my process can be utilized, for example, for conversion of chromate to bichromate. Furthermore, my process beneficially generates nitrogen gas from ammonium ion. Thus, not only does my process avoid costly neutralization and the addition of a contaminating ion difficult to dispose of, but also my process generates useful acid values and nitrogen.

As can be readily understood, the persulfate can be used in any amount to reduce ammonium ion concentration. Generally speaking, a relatively greater amount of the persulfate will result in the oxidation and removal of a relatively greater amount of ammonium ion. The best results for a particular concentration of ammonium ion can be easily determined by a simple experimentation. As suggested by the below Examples, in which about 0.5% ammonium ion is present in the liquors, near theoretical addition of the persulfate may be necessary to obtain about 90% removal of ammonium ion.

After addition of the persulfate to an ammonium ion-containing, acidic liquor, oxidation of ammonium ion is readily effected by heating the liquor to an elevated temperature, such as the boiling point thereof. For the liquors tested, I found that boiling for about one hour was usually efficacious. As can be readily understood, a relatively higher temperature will result in relatively more rapid removal of ammonium ion.

If desired, the pH of an ammonium ion-containing, acidic liquor may be adjusted prior to oxidatively reacting the persulfate and ammonium ion. The optimal reaction temperature, reaction time and pH for a particular liquor can be readily determined by simple trial and error.

In the Examples and Comparative Examples that follow and throughout this description and the claims set forth below, all percentages are by weight/weight, and all procedures are carried out at ambient temperature and pressure, unless otherwise specified.

EXAMPLE 1

An aqueous solution is prepared containing 69.8% sodium bichromate dihydrate and 0.51% ammonium bichromate. Analysis shows the solution to contain 0.073% ammonium ion. One hundred grams of the solution is heated to 100° C., and 5.0 g of sodium persulfate dissolved in a small amount of water, is added. After boiling for one hour, the solution is cooled to room temperature and analyzed for ammonium ion. The solution is found to contain 0.006% ammonium ion. Thus, about 90% ammonium ion removal is achieved.

EXAMPLE 2

One hundred grams of an aqueous solution containing 69.0% sodium bichromate dihydrate and 0.42% ammonium bichromate is brought to a boil, and 5.0 g of sodium persulfate dissolved in a small amount of water, is added to the boiling solution. After boiling for one hour, the solution is cooled and analyzed for % total inorganic nitrogen. The solution is found to contain 0.004% ammonium ion, based on analysis for % total inorganic nitrogen. Accordingly, about 92% ammonium ion removal is effected.

EXAMPLES 3-5

Following the procedure of Example 2 using 2.5, 1.25 and 0.75 g of sodium persulfate, rather than 5.0 g thereof, 92%, 91% and 38% removal of ammonium ion, respectively, is achieved.

COMPARATIVE EXAMPLE 1

An aqueous solution containing 70.8% sodium bichromate dihydrate and 0.45% ammonium bichromate is boiled for one hour, and analyzed for ammonium ion after cooling to room temperature. Before boiling, the solution contains 0.064% ammonium ion, based on analysis for % total inorganic nitrogen; and after boiling, the solution is found by analysis to contain 0.064% ammonium ion as total inorganic nitrogen. As expected, no ammonium ion is removed by mere boiling of the solution.

COMPARATIVE EXAMPLE 2

An aqueous solution containing about 69.0% sodium bichromate dihydrate and 0.42% ammonium bichromate is prepared. The pH of the solution is about 3.5. The solution pH is lowered to 0.3 with sulfuric acid, and the solution is brought to a boil for one hour. Analysis after cooling, shows the solution contains 0.069% ammonium ion, based on analysis for total inorganic nitrogen. Thus, merely acidifying the solution produces no reduction in ammonium content.

The above examples are illustrative of the present invention. It is to be understood that these examples are not in any way to be interpreted as limiting the scope of the invention. Rather, it is intended that the scope of the invention be defined by the claims set forth below. I contemplate that the invention as hereinafter claimed, will be subject to various modifications, which modifications are within the scope thereof.

INDUSTRIAL APPLICABILITY

The process of this invention is useful for removing ammonium ion from acidic or mildly acidic liquors, such as bichromate liquors.

I claim:

1. A process for reducing ammonium ion concentration in an ammonium ion-containing, acidic liquor comprising sodium dichromate and having a pH of 2.5-4.5, said process comprising oxidatively converting ammonium ion in said acidic liquor, to nitrogen with a reagent consisting essentially of a persulfate at a temperature above ambient.

2. The process of claim 1, wherein said persulfate is sodium persulfate.

3. The process of claim 1, wherein said persulfate is used in an amount about stoichiometrically equivalent to the amount of ammonium ion in said acidic liquor.

4. The process of claim 1 wherein the temperature is the atmospheric pressure boiling temperature of said acidic liquor.

* * * * *